(12) United States Patent
Kim et al.

(10) Patent No.: US 12,496,568 B2
(45) Date of Patent: Dec. 16, 2025

(54) BUFFER MATERIAL COMPOSED OF BENTONITE MODIFIED WITH LAYERED DOUBLE HYDROXIDE(LDH) AND METHOD OF PREPARING THE SAME

(71) Applicant: POSTECH RESEARCH AND BUSINESS DEVELOPMENT FOUNDATION, Pohang-si (KR)

(72) Inventors: Ju Eun Kim, Pohang-si (KR); Seok Ju Hong, Pohang-si (KR); Woo Yong Um, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 562 days.

(21) Appl. No.: 18/066,456

(22) Filed: Dec. 15, 2022

(65) Prior Publication Data

US 2023/0381737 A1 Nov. 30, 2023

(30) Foreign Application Priority Data

May 26, 2022 (KR) .......... 10-2022-0064675

(51) Int. Cl.
| | |
|---|---|
| *B01J 20/08* | (2006.01) |
| *B01J 20/12* | (2006.01) |
| *B01J 20/30* | (2006.01) |
| *C01G 29/00* | (2006.01) |
| *C01G 51/82* | (2025.01) |
| *C01G 53/82* | (2025.01) |

(52) U.S. Cl.
CPC .......... *B01J 20/08* (2013.01); *B01J 20/12* (2013.01); *B01J 20/3042* (2013.01); *B01J 20/3085* (2013.01); *C01G 29/006* (2013.01); *C01G 51/82* (2025.01); *C01G 53/82* (2025.01); *C01P 2002/22* (2013.01)

(58) Field of Classification Search
CPC ........ B01J 20/08; B01J 20/12; B01J 20/3042; B01J 20/3085; C01G 29/006; C01G 51/82; C01G 53/82; C01P 2002/22; G21F 9/001; C01B 33/40
See application file for complete search history.

(56) References Cited

FOREIGN PATENT DOCUMENTS

| | | | | |
|---|---|---|---|---|
| CN | 112337424 A | * | 2/2021 | .............. C02F 1/281 |
| CN | 113842874 A | * | 12/2021 | .............. C02F 1/281 |
| JP | 06000366 | | 1/1994 | |
| KR | 2001-0015686 | | 2/2001 | |

(Continued)

OTHER PUBLICATIONS

Translation of CN_112337424 (Year: 2021).*

(Continued)

*Primary Examiner* — Daniel Berns
*Assistant Examiner* — Joshua Maxwell Speer
(74) *Attorney, Agent, or Firm* — LEX IP MEISTER, PLLC

(57) ABSTRACT

The present invention relates to a method of preparing a buffer material composed of bentonite modified with a layered double hydroxide (LDH) as a buffer material used for deep geological disposal of radioactive waste, the method including a step (a) of producing a first mixture by adding a compound containing a divalent cationic material, aluminum nitrate $(Al(NO_3)_3)$, and bismuth nitrate $(Bi(NO_3)_3)$ to a reactor.

13 Claims, 4 Drawing Sheets

(56) References Cited

FOREIGN PATENT DOCUMENTS

KR     10-2014-0134571     11/2014
KR     10-1559100     10/2015

OTHER PUBLICATIONS

Translation of CN_113842874 (Year: 2021).*
Kim, Jueun, et al. "Enhanced Iodine Sorption by Layered Double Hydroxides Modified Bentonite" Korean Radioactive Waste Society Conference, Nov. 17-19, 2021.

* cited by examiner

BUFFER MATERIAL COMPOSED OF BENTONITE MODIFIED WITH LAYERED DOUBLE HYDROXIDE(LDH) AND METHOD OF PREPARING THE SAME

CROSS-REFERENCE TO RELATED APPLICATIONS

This application claims priority under 35 U.S.C. § 119 to Korean Patent Application No. 10-2022-0064675, filed on May 26, 2022, in the Korean Intellectual Property Office, the disclosure of which is incorporated herein by reference in its entirety.

TECHNICAL FIELD

The present invention relates to a method of preparing a buffer material composed of bentonite modified with a layered double hydroxide (hereinafter referred to as LDH) as a buffer material used for deep geological repository for radioactive waste disposal, and a buffer material obtained according to the method, and more particularly, to a method of preparing a buffer material having excellent removal efficiency of cationic and anionic radionuclides by modifying a surface of bentonite having excellent removal efficiency of cationic radionuclides, and a buffer material obtained according to the method.

BACKGROUND

Spent nuclear fuel generated during an operation of a nuclear power plant is classified as high-level waste (HLW) and is stored in a temporary storage facility inside the nuclear power plant for a certain period because high heat and radiation are released from the spent nuclear fuel.

Deep geological disposal is a method of disposing of radioactive waste with a natural barrier and an engineered barrier located hundreds of meters below the surface in a stable geological structure deep underground. The deep geological repository is a concept of permanent disposal for safe disposing of high-risk radioactive waste by usually building a disposal facility in bedrock at a depth of 300 to 1,000 meters underground for disposal of HLW.

An engineered barrier system for disposing of HLW includes a disposal container, a buffer material, a backfill material, and the like, and the performance of these components has a significant influence on the safety of the entire engineered barrier system.

A bentonite buffer material, one of the engineered barrier materials of an HLW disposal facility, serves to minimize the inflow of groundwater from the surrounding bedrock, to prevent the leakage of radionuclides into environment, and to protect an HLW disposal container from an external mechanical shock.

However, in general, the bentonite buffer material has excellent removal efficiency of cations, but is known to have significantly low (or no) removal efficiency of anions. Therefore, the development of a technology of increasing disposal safety by increasing anion removal efficiency based on bentonite, which is currently used as a buffer material, has been demanded.
(Patent Document 1) KR 10-1559100 B

SUMMARY

An object of the present invention is to provide a method of preparing a buffer material capable of efficiently removing not only cationic radionuclides but also anionic radionuclides.

In one general aspect, a method of preparing a buffer material used for deep geological disposal of radioactive waste includes: a step (a) of producing a first mixture by adding a compound containing a divalent cationic material, aluminum nitrate ($Al(NO_3)_3$), and bismuth nitrate ($Bi(NO_3)_3$) to a reactor.

The method may further include a step (b) of producing a second mixture by adding bentonite to the first mixture produced in the step (a).

The compound containing a divalent cationic material may be any one of cobalt nitrate ($Co(NO_3)_2$), copper nitrate ($Cu((NO_3)_2)$), and nickel nitrate ($Ni((NO_3)_2)$).

In the step (a), in a state in which ultrapure water is included in the reactor, the compound containing a divalent cationic material at a molar concentration of 0.1 to 0.2 may be added per 100 mL of the ultrapure water.

In the step (a), the aluminum nitrate ($Al(NO_3)_3$) at a molar concentration of 0.02 to 0.04 may be added per 100 mL of the ultrapure water.

In the step (a), the bismuth nitrate ($Bi(NO_3)_3$) at a molar concentration of 0.01 to 0.03 may be added per 100 mL of the ultrapure water.

In the step (b), the bentonite may be added in an amount of 5 to 10 g per 100 mL of the ultrapure water.

In the step (a), nitric acid ($HNO_3$) at a molar concentration of 0.5 to 1.5 may be further included in the reactor.

The method may further include a step (c) of titrating the second mixture produced in the step (b) to a pH of 8.5 to 9.5.

The method may further include, after the step (c), a step (d) of aging the second mixture at a constant temperature.

In the step (d), the second mixture may be aged while the reactor in a sealed state is placed in an oven at 75 to 85° C. for 20 to 28 hours.

In another general aspect, a buffer material is prepared by the method of preparing a buffer material.

In still another general aspect, a buffer material used for deep geological disposal of radioactive waste contains bentonite having a surface modified with a LDH.

The LDH may include aluminum (Al).

The LDH may include bismuth (Bi).

The LDH may include any one of cobalt (Co), copper (Cu), and nickel (Ni).

In still another general aspect, a method of disposing of radioactive waste includes disposing of radioactive waste with the buffer material.

Other features and aspects will be apparent from the following detailed description, the drawings, and the claims.

DETAILED DESCRIPTION OF EMBODIMENTS

Figure 1:
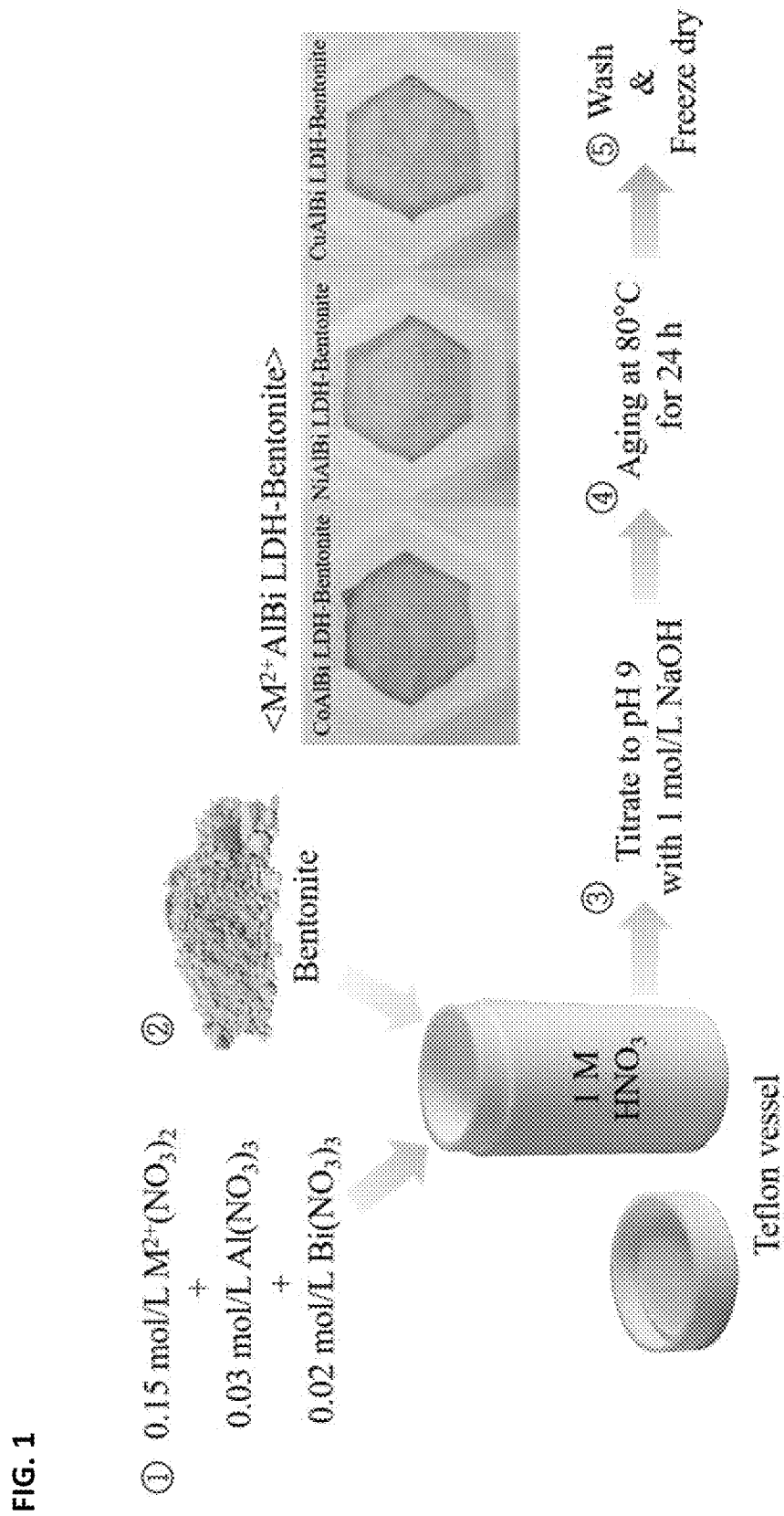
FIG. 1 is a schematic view illustrating a method of preparing a buffer material according to the present invention.

Hereinafter, preferred embodiments of a method according to the present invention will be described in detail with reference to the accompanying drawings. In this process, thicknesses of lines, sizes of components, and the like, illustrated in the accompanying drawings may be exaggerated for clearness of explanation and convenience. In addition, terms to be described below are defined in consideration of functions in the present invention and may be construed in different ways by the intention of users or operators or practice. Therefore, these terms should be defined on the basis of the contents throughout the present specification.

The present invention relates to a method of preparing a buffer material having improved anion adsorption ability by using anion exchange characteristics of LDH, and more particularly, to a method of modifying a surface of bentonite used as a buffer material with a LDH and modified bentonite prepared according to the method.

The LDH is one of anionic clays, and is generally represented by a chemical formula $[M^{2+}_{1-x}M^{3+}_x(OH)_2](A^{n-})_{x/n} \cdot mH_2O$.

In LDH, a divalent metal cation ($M^{2+}$) is surrounded by six hydroxyl groups in the form of an octahedron, and some $M^{2+}$ are isomorphically substituted with trivalent metal cations ($M^{3+}$). Therefore, LDH has a two-dimensional layered structure in which a surface is positively charged. At this case, anions ($A^{n-}$) are inserted between the layers having a positive charge to balance the charges, and the anions ($A^{n-}$) have a characteristic of being exchangeable with other anions.

1. A method of preparing a buffer material according to the present invention will be described with reference to FIG. 1.

(1) Production of First Mixture

A first mixture may be produced by adding a compound containing a divalent cationic material, aluminum nitrate ($Al(NO_3)_3$), and bismuth nitrate ($Bi(NO_3)_3$) to a reactor including ultrapure water and nitric acid and stirring the mixture.

Here, the compound containing a divalent cationic material may be any one of cobalt nitrate ($Co(NO_3)_2$) containing cobalt cations ($Co^{2+}$), copper nitrate ($Cu((NO_3)_2$) containing copper cations ($Cu^{2+}$), and nickel nitrate ($Ni((NO_3)_2$) containing nickel cations ($Ni^{2+}$).

Here, the compound containing a divalent cationic material at a molar concentration of 0.1 to 0.2 may be added per 100 mL of the ultrapure water, the aluminum nitrate ($Al(NO_3)_3$) at a molar concentration of 0.02 to 0.04 may be added per 100 mL of the ultrapure water, and the bismuth nitrate ($Bi(NO_3)_3$) at a molar concentration of 0.01 to 0.03 may be added per 100 mL of the ultrapure water.

(2) Production of Second Mixture

A second mixture may be produced by adding bentonite to the first mixture and stirring the mixture. Here, the bentonite may be added in an amount of 5 to 10 g per 100 mL of the ultrapure water.

Thereafter, the produced second mixture may be titrated to a pH of 8.5 to 9.5.

(3) Aging and Lyophilization

In a state in which the second mixture titrated to a pH of 8.5 to 9.5 is included in the reactor and the reactor is sealed and then placed in an oven at a constant temperature for a certain period of time, the second mixture may be aged while being stirred.

After the aging, a solid may be separated using centrifugation, the solid may be washed three times with ultrapure water, and then the washed solid may be lyophilized, thereby preparing a buffer material composed of bentonite having a surface modified with a LDH.

In FIG. 1, $M^{2+}$AlBi LDH-Bentonite represents bentonite modified with a LDH containing a divalent cationic material.

2. Specific examples will be described.

To a reactor containing 100 mL of ultrapure water and nitric acid ($HNO_3$) at a molar concentration of 1, a compound containing a divalent cationic material at a molar concentration of 0.15, aluminum nitrate ($Al(NO_3)_3$) at a molar concentration of 0.03, and bismuth nitrate ($Bi(NO_3)_3$) at a molar concentration of 0.02 were added, and the mixture was stirred, thereby producing a first mixture.

Thereafter, 5 to 10 g of bentonite was added to the first mixture, and the mixture was stirred, thereby producing a second mixture.

Thereafter, the second mixture was titrated to a pH of 9 using sodium hydroxide (NaOH).

Thereafter, the reactor including the second mixture was sealed, and then the second mixture was aged while being stirred in an oven at 80° C. for 24 hours.

Thereafter, a solid was separated using centrifugation, the separated solid was washed three times with ultrapure water, and then the washed solid was lyophilized, thereby preparing bentonite having a surface modified with a LDH.

Bentonite is a smectite-based clay mineral mainly containing montmorillonite, and has a plate-like structure in which one alumina plate is sandwiched between two silica plates (silica plate:alumina plate=2:1). In this case, when isomorphic substitution in which $Si^{4+}$ is substituted with $Al^{3+}$ or $Al^{3+}$ is substituted with $Fe^{2+}$ or $Mg^{2+}$ within a tetrahedron occurs, a form that satisfies an insufficient charge with $Na^+$ is sodium bentonite, and a form that satisfies an insufficient charge with $Ca^{2+}$ is calcium bentonite.

Compared to other clay minerals, bentonite exhibits a significantly higher cation exchange capacity, which is due to a permanently negative charge caused by isomorphic substitution and exchangeable cations such as $Na^+$, $Ca^{2+}$, and $Mg^{2+}$ present between the layers of bentonite.

The synthesis principle of bentonite having a surface modified with a LDH($M^{2+}$AlBi LDH-Bentonite) is as follows. When a divalent cationic metal salt and a trivalent cationic metal salt are added and a NaOH base solution is added for pH titration, and then aging is performed, a LDH is formed. In this case, since nanoparticles of the LDH formed are positively charged, the nanoparticles are aggregated on a negatively charged surface of bentonite.

Figure 2:
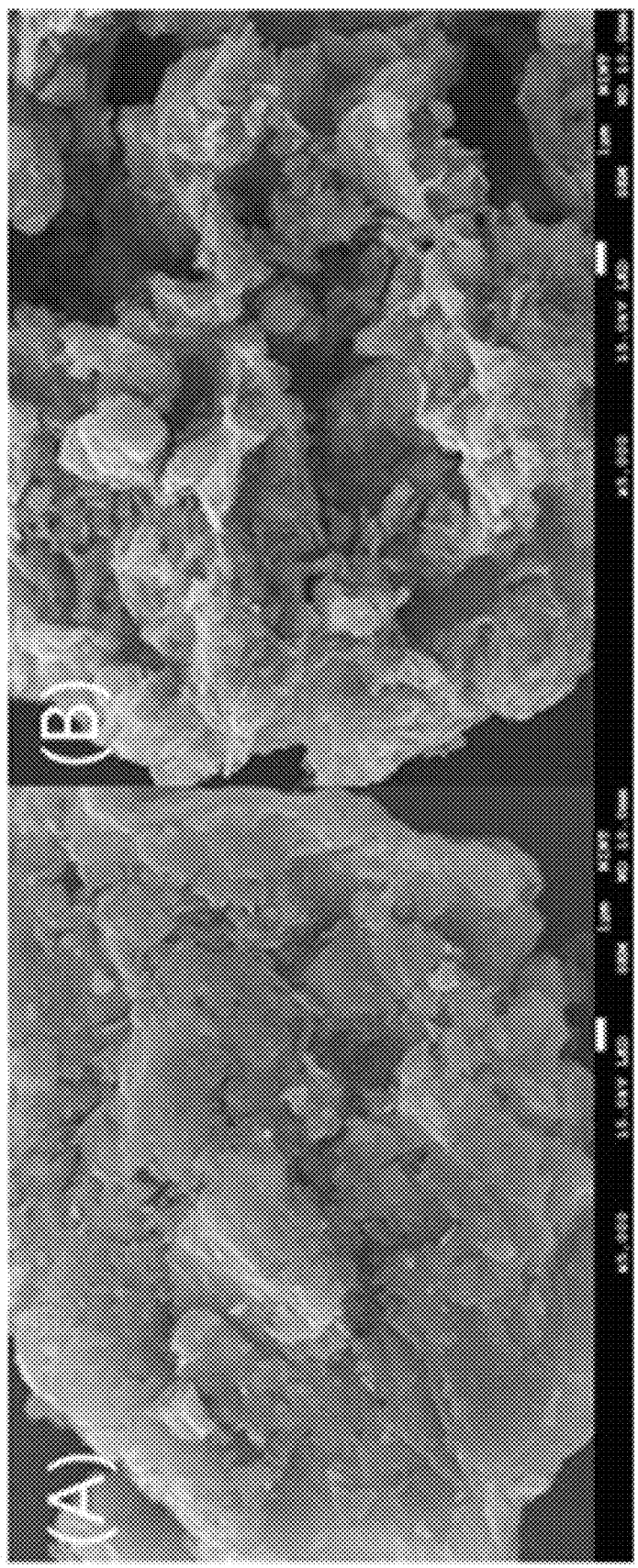
FIGS. 2A and 2B are micrographs of bentonite having a surface modified with a LDH.

It will refer to FIG. 2. As a result of scanning electron microscopic analysis of the synthesized buffer material, nano-sized particles, which were formed by aggregation of LDHs on the surface of the bentonite and piled up in thin layers, were observed.

In FIG. 2, (A) is a photograph of bentonite and (B) is a photograph of bentonite modified with a LDHs containing cobalt cations (CoAlBi LDH-Bentonite).

3. Experiment on Adsorption Efficiency and Experimental Result

Figure 3:
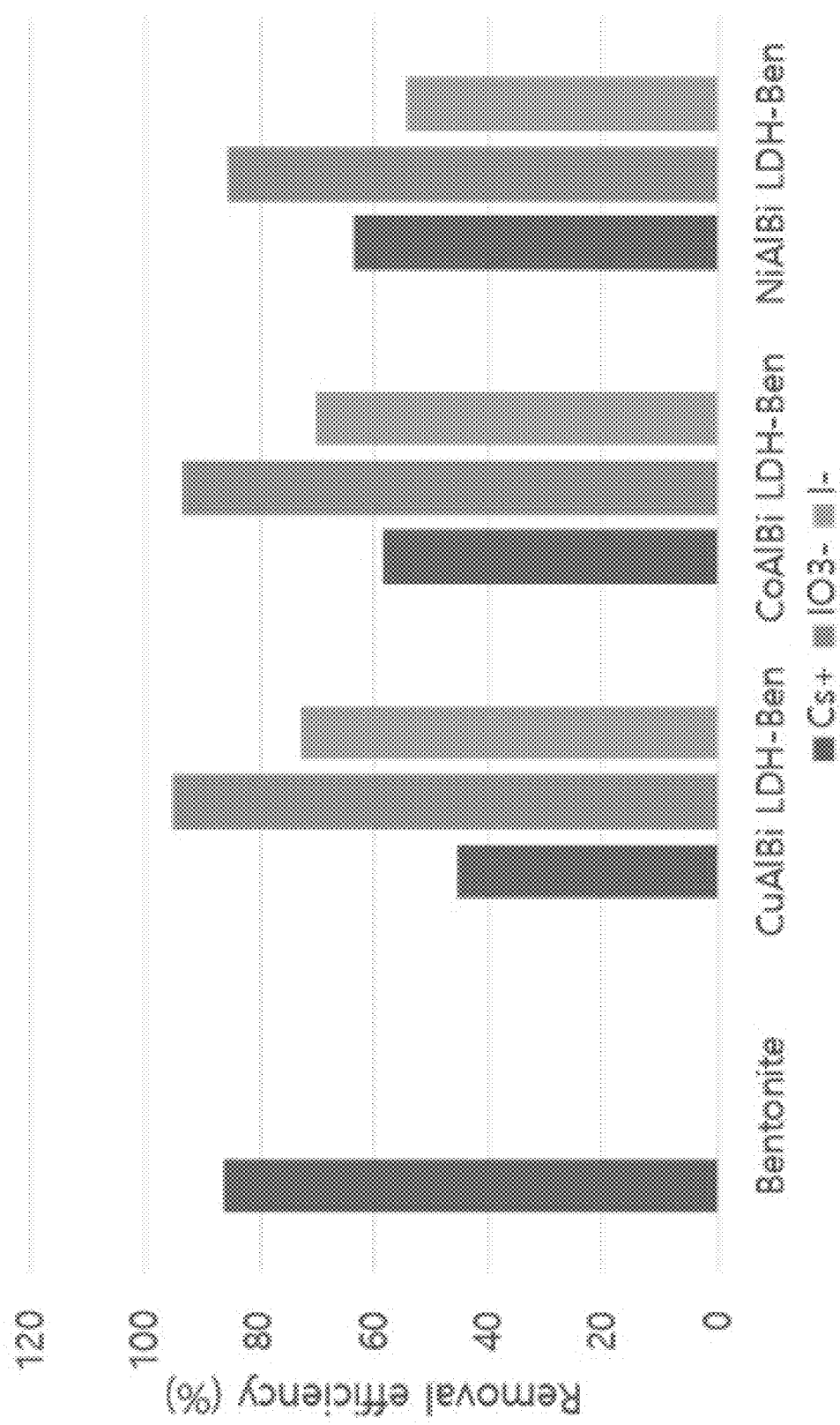
FIGS. 3 and 4 are graphs showing experimental results of removal efficiency of the buffer material prepared according to the present invention.

It will be described with reference to the experimental result shown in Table 1 and FIG. 3.

An experiment on adsorption efficiency of modified bentonite for cationic and anionic radionuclides was carried out for a reaction time of 4 days by adding each bentonite having a surface modified with LDHs prepared by being added to the first mixture in an amount of 5 g and unmodified bentonite to each reaction solution at a target concentration of radionuclides of 100 mg/L at a solid-liquid reaction ratio of 0.4 g/40 mL.

TABLE 1

| | $Cs^+$ | $IO_3^-$ | $I^-$ |
|---|---|---|---|
| Bentonite | 86.48 | 0.00 | 0.00 |
| CuAlBi LDH-Bentonite | 45.47 | 95.40 | 72.96 |
| CoAlBi LDH-Bentonite | 58.70 | 93.68 | 70.19 |
| NiAlBi LDH-Bentonite | 63.86 | 85.75 | 54.36 |

The experimental result was shown that when the content of unmodified bentonite was compared with the content of bentonite having a surface modified with LDHs, the content of the modified bentonite was reduced compared to the content of the unmodified bentonite in terms of the same unit amount, the overall removal efficiency of $Cs^+$ was reduced a little bit in the modified bentonite, but the removal efficiency of the iodine species ($I^-$ and $IO_3^-$) in the modified bentonite was significantly increased than in the unmodified bentonite. In particular, it may be seen that the removal efficiency of $IO_3^-$ is increased by 85% or more compared to the removal efficiency of $I^-$. It is presumed that a difference in removal efficiency occurs because the ionic radius of $I^-$ (0.210 nm) is larger than that of $IO_3^-$ (0.122 nm).

The experimental result on the removal efficiency of radionuclides of the modified bentonite according to the content of bentonite added will be described with reference to FIG. 4.

As an experiment on removal efficiency of cationic and anionic radionuclides, an experiment on removal efficiency of modified bentonite according to the content of bentonite added was carried out for a reaction time of 4 days by adding each bentonite having a surface modified with LDHs prepared by being added to the first mixture in an amount of 6 g to 10 g and unmodified bentonite to each reaction solution at a target concentration of radionuclides of 1 mmol/L at a solid-liquid reaction ratio of 0.4 g/40 mL.

Figure 4:
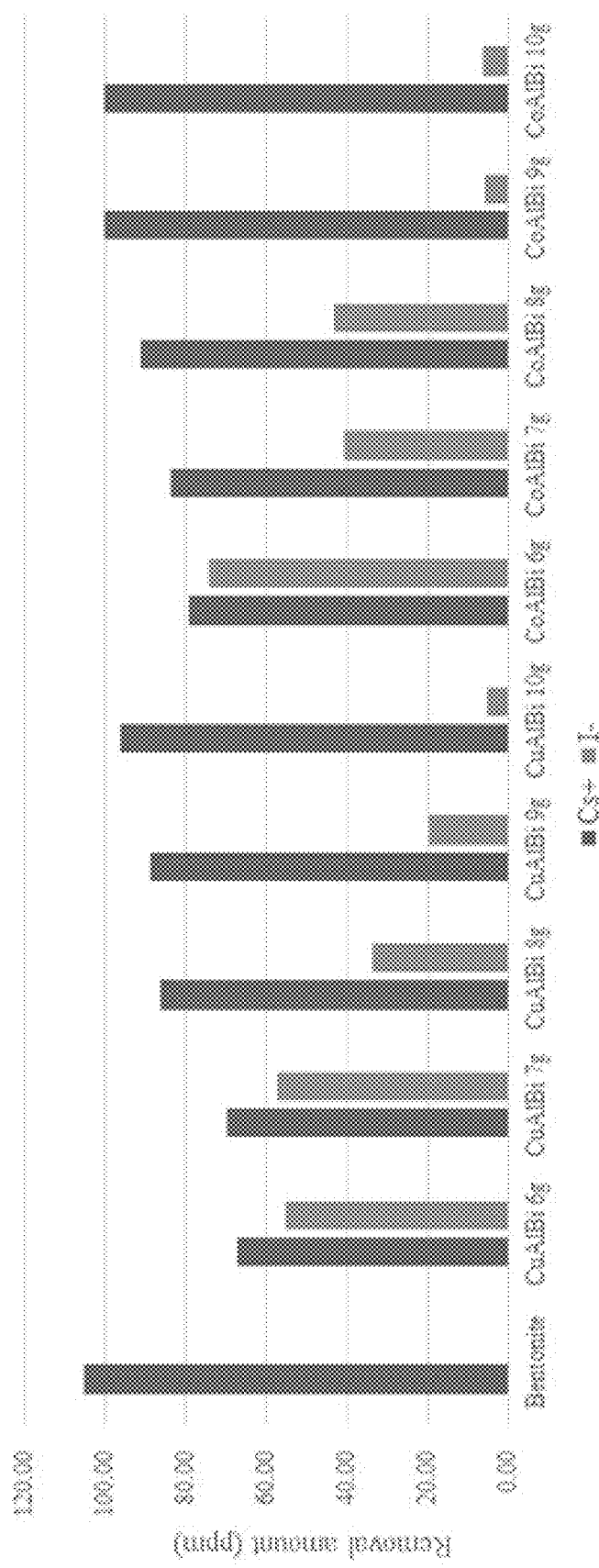

In FIG. 4, CuAlBi represents bentonite modified with a LDH containing copper cations (CuAlBi LDH-Bentonite), and CoAlBi represents bentonite modified with a LDH containing cobalt cations (CoAlBi LDH-Bentonite).

As a result of the experiment, it may be seen that modified bentonite with optimized removal efficiency may be prepared by adjusting the content of bentonite according to the concentration or type of the radionuclides in the target solution. In a case where high amounts of anionic radionuclides are present, modified bentonite prepared by adding about 6 g of bentonite may be applied, and in a case where both cationic radionuclides and anionic radionuclides are present in large amounts, modified bentonite prepared by adding about 7 g to 8 g of bentonite may be applied for the optimized removal efficiency.

Owing to the above-described technical solution, it is possible to prepare a buffer material capable of efficiently removing not only cationic radionuclides but also anionic radionuclides by modifying a surface of bentonite having excellent removal efficiency of cationic radionuclides with a LDH, and therefore, it is possible to improve the safety of radioactive material disposal in a radioactive waste disposal facility where such a buffer material is used.

Hereinabove, the present specification has been described with reference to the embodiments illustrated in the drawings so that those skilled in the art can easily understand and reproduce the present invention, but this is only exemplary, and those skilled in the art will understand that various modifications and equivalent other embodiments are possible from the embodiments of the present invention. Therefore, the scope of protection of the present invention should be determined by the claims.

What is claimed is:

1. A method of preparing a buffer material used for deep geological disposal of radioactive waste, the method comprising:
    a step (a) of producing a first mixture by adding a compound containing a divalent cationic material, aluminum nitrate ($Al(NO_3)_3$), and bismuth nitrate ($Bi(NO_3)_3$) to a reactor; and
    a step (b) of producing a second mixture by adding bentonite to the first mixture produced in the step (a).

2. The method of claim 1, wherein the compound containing a divalent cationic material is any one of cobalt nitrate ($Co(NO_3)_2$), copper nitrate ($Cu((NO_3)_2)$), and nickel nitrate ($Ni((NO_3)_2)$).

3. The method of claim 2, wherein in the step (a), in a state in which ultrapure water is included in the reactor, the compound containing a divalent cationic material is added to 100 ml of the ultrapure water to be at a molar concentration of 0.1 to 0.2.

4. The method of claim 3, wherein in the step (a), the aluminum nitrate ($Al(NO_3)_3$) is added to 100 mL of the ultrapure water to be at a molar concentration of 0.02 to 0.04.

5. The method of claim 4, wherein in the step (a), the bismuth nitrate ($Bi(NO_3)_3$) is added to 100 ml of the ultrapure water to be at a molar concentration of 0.01 to 0.03.

6. The method of claim 5, wherein in the step (b), the bentonite is added in an amount of 5 to 10 g to 100 mL of the ultrapure water.

7. The method of claim 6, wherein in the step (a), nitric acid ($HNO_3$) at a molar concentration of 0.5 to 1.5 is further included in the reactor.

8. The method of claim 7, further comprising a step (c) of titrating the second mixture produced in the step (b) to a pH of 8.5 to 9.5.

9. The method of claim 8, further comprising, after the step (c), a step (d) of aging the second mixture at a constant temperature.

10. The method of claim 9, wherein in the step (d), the second mixture is aged while the reactor in a sealed state is placed in an oven at 75 to 85° C. for 20 to 28 hours.

11. A buffer material prepared by the method of preparing a buffer material of claim 1.

12. A buffer material used for deep geological disposal of radioactive waste, the buffer material comprising bentonite having a surface modified with a LDH,
    wherein the LDH includes aluminum (Al) and bismuth (Bi).

13. The buffer material of claim 12, wherein the LDH includes any one of cobalt (Co), copper (Cu), and nickel (Ni).

* * * * *